Patented Aug. 2, 1927.

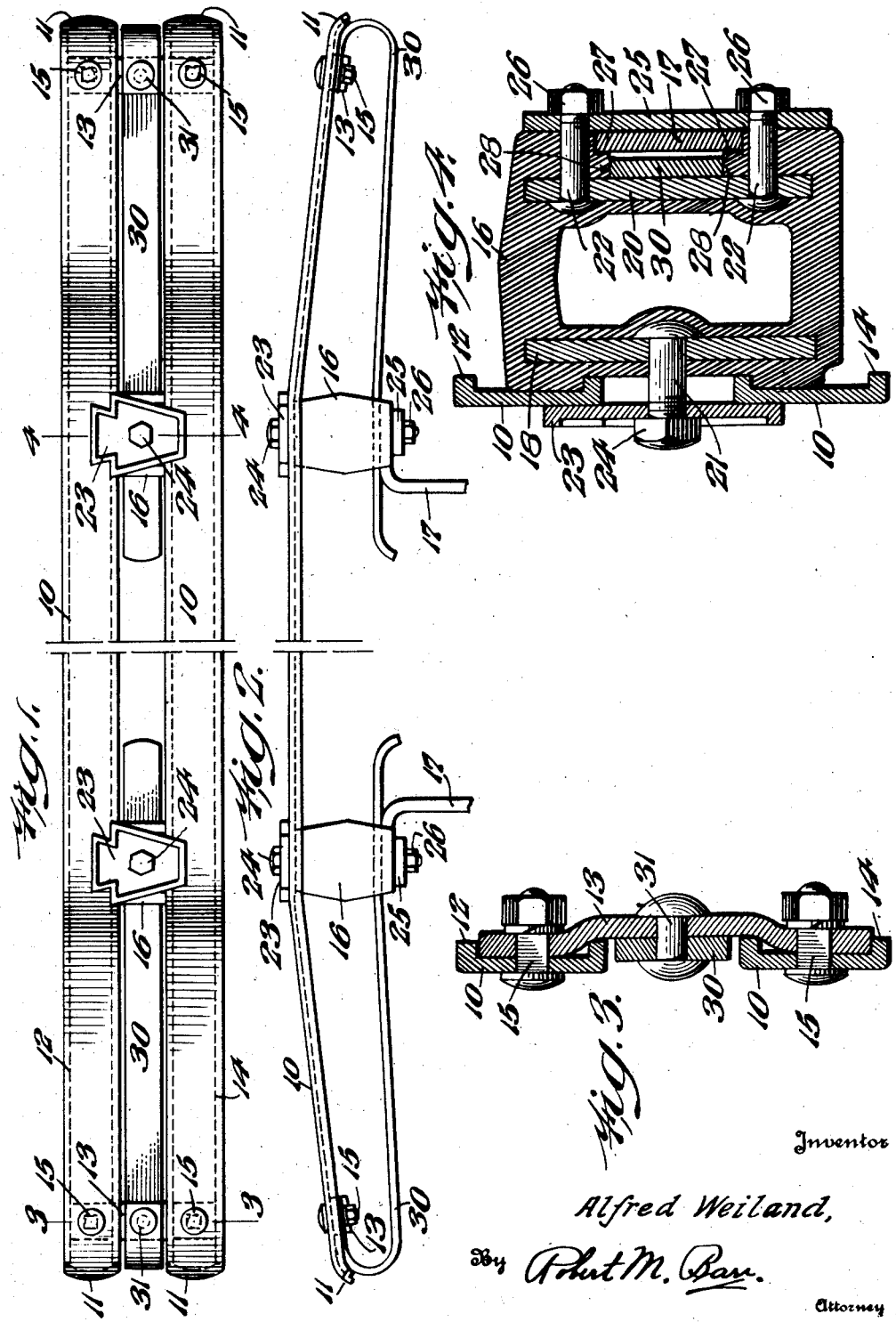

1,637,364

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

VEHICLE BUMPER.

Application filed November 19, 1926. Serial No. 149,402.

The present invention relates to vehicle bumpers and more particularly to an impact bar structure supplemented by cushioning elements.

Some of the objects of the present invention are to provide an improved shock absorbing vehicle bumper; to provide a vehicle bumper which is not only simple in construction and cheap to manufacture and assemble but has exceptional shock resisting and shock absorbing qualities; to provide a spring metal bumper operating in conjunction with resilient cushioning elements of rubberized or like material; to provide a bumper having rearwardly curved ends provided with guard members to prevent interlocking of such ends with adjacent objects; to provide a bumper having relatively movable guard members to permit full absorption of lateral thrusts by the impact bars; and to provide other improvements as will hereinafter appear.

In the accompanying drawings, Fig. 1 represents a front elevation of a vehicle bumper embodying one form of the present invention; Fig. 2 represents a plan of the same; Fig. 3 represents a section on line 3—3 of Fig. 1; and Fig. 4 represents a section on line 4—4 of Fig. 1.

Referring to the drawings one form of the present invention consists of a plurality of impact bars 10, two being shown, arranged in superposed edge to edge spaced relation, and each having rearwardly bent end portions which terminate in rearwardly curved ends 11. In section the impact bars 10 are of channel shape and the upper flange 12 of the top bar 10 forms a seat for one end of spacer bars 13 while the lower flange 14 of the bottom bar 10 forms a seat for the other end of the spacer bar 13. Thus the spacer bars 13 rigidly maintain the impact bars 10 in parallel spaced relation and provide reinforcement at the bumper ends. These bars 13 are preferably bowed at their middle portion to allow the ends to fit flush with the rear faces of the respective bars 10 and in this position the parts are clamped together by stud bolts 15.

For supporting the assembled impact bars 10 from a vehicle frame in a manner to increase the natural cushioning or shock absorbing qualities of the impact bars 10, a plurality of cushioning elements 16 of rubber or rubberized fabric are interposed at selected locations in the length of the impact bars 10. In the form illustrated, there are two of these elements 16 mounted respectively between the support bars 17, which extend from the vehicle frame, and the impact bars 10. Preferably the elements 16 are each molded as a hollow body having metal plate inserts 18 and 20 embedded in opposite sides thereof during the molding operation to resist strains and stresses and provide a means to distribute forces acting upon the fastening devices. These devices consist of a stud bolt 21 molded to project from the front of the element 16 and being anchored by the plate insert 18, and stud bolts 22 projecting from the rear of the element 16 and being anchored by the plate insert 20.

For clamping the elements 16 to the impact bars 10, plates 23, here shown as of keystone shape, are respectively placed over the stud bolts 21 to seat against the front faces of the impact bars 10 where they are held by nuts 24, thus rigidly holding the impact bars in proper spaced relation and providing a substantially unitary structure capable of yielding under impacts received upon its face.

For mounting the rear ends of the cushioning elements 16, the stud bolts 22 of each element project through a flat bar strip 25 which is held by nuts 26 in clamping engagement with the inturned ends of the support bars 17 which seat upon shoulders 27 molded into the respective elements 16. Each of the elements 16 is also molded with a transverse groove 28 for receiving guard bars 30 respectively. These bars 30 are respectively clamped at one end by bolts 31 to the spacer bars 13 and have a position between the impact bars 10, while their other ends are free but guided in the respective grooves 28. Thus each bar 30 is reversely curved from its juncture with the impact spacer bar so that its guard length lies in the plane of the grooves 28 and in this way is free to move relative to the cushioning element and its clamping parts. It should be noted that it is preferable to form these guard bars 30 of relatively light stock since they are not in a true sense shock resisting members but function more properly to deflect any objects which might otherwise be hooked or caught by the ends of the impact bars when moving in any direction except the forward one. Also in case of lateral or end thrusts received by the impact bars 10, these guard bars 30 are free to yield by slip action in the grooves 28 and consequently the impact bars 10 are relatively free for maximum shock resisting movement.

It will now be apparent that a complete unitary vehicle bumper has been provided wherein a free-end impact bar construction operates effectively to reduce and minimize shocks and which is supplemented by auxiliary shock absorbing elements so disposed as to lessen and relieve the impact bars under maximum impacts. Furthermore by providing guard members of relatively light constuction, the disadvantages due to interlocking of the free ends of the impact bars are overcome, while the mounting of these guard members for slip movement allows the desired full yielding action of the impact bar ends.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A vehicle bumper comprising an impact bar, supports for connection to a vehicle frame, cushioning elements interposed between said impact bar and said supports, and guard members slidably mounted respectively on said cushioning elements and joined at one end to the respective ends of said impact bar.

2. A vehicle bumper comprising a pair of impact bars, spacer bars connecting the ends of said impact bars respectively, supports for connection to a vehicle frame, cushioning elements interposed between said impact bars and said supports, and guard members slidably mounted respectively on said cushioning elements and joined at one end respectively to the spacer bars.

3. A vehicle bumper comprising a pair of impact bars, supports for connection to a vehicle frame, rubber or rubberized fabric cushioning elements interposed between said impact bars and said supports, guard members slidably mounted on the respective cushioning elements, and means for respectively connecting said guard members to said impact bars.

4. A vehicle bumper comprising a pair of impact bars, supports for connection to a vehicle frame, hollow cushioning elements of molded material interposed between said impact bars and said supports, said cushioning elements being each formed with a seat to receive an end of one of said supports, and a transverse groove, guard members mounted and arranged to slide respectively in said grooves, means for respectively connecting said guard members to said impact bars, and means to clamp said cushioning elements to said supports.

5. A vehicle bumper comprising a pair of impact bars, spacer bars connecting the ends of said impact bars, respectively, supports for connection to a vehicle frame, hollow cushioning elements of molded material interposed between said impact bars and said supports, said cushioning elements being each formed with a seat to receive an end of one of said supports, and a transverse groove, guard members mounted and arranged to slide respectively in said grooves, means for respectively connecting said guard members to said spacer bars, and means for clamping said cushioning elements to said supports.

6. A vehicle bumper comprising a pair of impact bars, each flanged at its top and bottom to form a channel section, spacer bars shaped to seat their respective ends within the channels of said impact bars, means to clamp said impact bars and spacer bars together, supports for connection to a vehicle frame, cushioning elements interposed between said impact bars and said supports, means for fastening the sides of said cushioning elements to the respective impact bars and supports, guard members slidably mounted on said cushioning elements, and means for connecting said guard members to the respective spacer bars.

Signed at Philadelphia, county of Philadelphia, State of Pennsylvania, this 5th day of November, 1926.

ALFRED WEILAND.